US012517807B2

(12) United States Patent
Zekri et al.

(10) Patent No.: US 12,517,807 B2
(45) Date of Patent: Jan. 6, 2026

(54) FORMING MARKED SOURCE CODE TO ASCERTAIN APPLICATION TEST COVERAGE

(71) Applicant: Dell Products L.P., Round Rock, TX (US)

(72) Inventors: Ishay Zekri, Sharon (IL); Yair Fodor, Tivka, IL (US); Jun Hu, Shanghai (CN); Xiaojian Wang, Shanghai (CN); Dianming Yuan, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 189 days.

(21) Appl. No.: 18/374,755

(22) Filed: Sep. 29, 2023

(65) Prior Publication Data

US 2025/0110857 A1    Apr. 3, 2025

(51) Int. Cl.
  *G06F 11/00* (2006.01)
  *G06F 8/71* (2018.01)
  *G06F 8/73* (2018.01)
  *G06F 11/3668* (2025.01)
  *G06F 11/3698* (2025.01)

(52) U.S. Cl.
  CPC .......... *G06F 11/3676* (2013.01); *G06F 8/71* (2013.01); *G06F 8/73* (2013.01); *G06F 11/3688* (2013.01); *G06F 11/3698* (2025.01)

(58) Field of Classification Search
  CPC .......... G06F 11/3676; G06F 8/71; G06F 8/73; G06F 11/3688; G06F 11/3698; G06F 11/3684
  See application file for complete search history.

(56) References Cited

U.S. PATENT DOCUMENTS

| 8,869,113 B2 | 10/2014 | Li et al. |
| 8,943,487 B2 | 1/2015 | Li et al. |
| 9,454,467 B2 | 9/2016 | Wu |
| 9,767,000 B1 | 9/2017 | Chida et al. |

(Continued)

FOREIGN PATENT DOCUMENTS

| CA | 2343496 C | * | 8/2006 | ............. G06F 9/454 |
| CA | 2981129 C | * | 10/2023 | ............. G06F 11/36 |

(Continued)

OTHER PUBLICATIONS

Ying et al., "An exploration of how comments are used for marking related code fragments", May 2005, ACM, pp. 1-4 (Year: 2005).*

*Primary Examiner* — Alexander Khong
(74) *Attorney, Agent, or Firm* — BainwoodHuang (57) ABSTRACT

A technique is directed to ascertaining application test coverage. The technique involves obtaining a source code identifier that identifies a source code section of unmarked source code for an application to be tested. The technique further involves providing a relation that includes the source code identifier and a feature identifier that identifies a feature provided by the source code section of unmarked source code. The technique further involves forming marked source code for the application to be tested from the relation and the unmarked source code. The marked source code for the application to be tested is testable to generate application test coverage results describing test coverage of the source code section.

19 Claims, 8 Drawing Sheets

(56) References Cited

U.S. PATENT DOCUMENTS

| | | | |
|---|---|---|---|
| 10,705,943 B2* | 7/2020 | Makkar | G06N 5/022 |
| 11,132,193 B1* | 9/2021 | Rosenbaum | G06F 8/71 |
| 12,072,790 B1* | 8/2024 | Pearson | G06F 11/3676 |
| 2022/0206789 A1* | 6/2022 | Rosenbaum | G06F 8/73 |
| 2024/0281228 A1* | 8/2024 | Vembu | G06F 8/433 |

FOREIGN PATENT DOCUMENTS

| | | | | |
|---|---|---|---|---|
| CN | 111290950 A | * | 6/2020 | G06F 11/3688 |
| CN | 117355818 A | * | 1/2024 | G06F 8/437 |
| EP | 4170504 A1 | * | 4/2023 | G06F 8/71 |
| JP | 2023047335 A | * | 4/2023 | G06F 8/30 |
| WO | WO-2023047398 A1 | * | 3/2023 | G06F 8/71 |

\* cited by examiner

```
#include <stdio.h>
int main() {
    int age;
    printf("Enter your age: ");
    scanf("%d", &age);

if (age >= 0 && age < 18) {
        printf("You are a junior.\n");
    } else if (age >= 18 && age < 65) {
        printf("You are an adult.\n");
    } else if (age >= 65) {
        printf("You are a senior citizen.\n");
    } else {
        printf("Invalid age.\n");
    } return 0;
}
```

Version Control System 114

210

```
5145f45a4a69    #include <stdio.h>
5145f45a4a69    int main() {
5145f45a4a69        int age;
5145f45a4a69        printf("Enter your age: ");
5145f45a4a69        scanf("%d", &age);

5145f45a4a69        if (age >= 0 && age < 18) {
5145f45a4a69            printf("You are a junior.\n");
5145f45a4a69        } else if (age >= 18 && age < 65) {
5145f45a4a69            printf("You are an adult.\n");
5145f45a4a69        } else if (age >= 65) {
5145f45a4a69            printf("You are a senior citizen.\n");
5145f45a4a69        } else {
5145f45a4a69            printf("Invalid age.\n");
5145f45a4a69        }

5145f45a4a69        return 0;
5145f45a4a69    }
```

```
#include <stdio.h>
int main() {
    int age;
    printf("Enter your age: ");
    scanf("%d", &age);

if (age >= 0 && age < 18) {
        printf("You are a minor.\n");
    } else if (age >= 18 && age < 65) {
        printf("You are an adult.\n");
    } else if (age >= 65) {
        printf("You are a senior citizen.\n");
    } else {
        printf("Invalid age.\n");
    } return 0;
}
```

Version Control System 114

310

```
5145f45a4a69    #include <stdio.h>
5145f45a4a69    int main() {
5145f45a4a69        int age;
5145f45a4a69        printf("Enter your age: ");
5145f45a4a69        scanf("%d", &age);

5145f45a4a69        if (age >= 0 && age < 18) {
30342c735945            printf("You are a minor.\n");
5145f45a4a69        } else if (age >= 18 && age < 65) {
5145f45a4a69            printf("You are an adult.\n");
5145f45a4a69        } else if (age >= 65) {
5145f45a4a69            printf("You are a senior citizen.\n");
5145f45a4a69        } else {
5145f45a4a69            printf("Invalid age.\n");
5145f45a4a69        }

5145f45a4a69        return 0;
5145f45a4a69    }
```

FORMING MARKED SOURCE CODE TO ASCERTAIN APPLICATION TEST COVERAGE

BACKGROUND

A conventional tool enables a software developer to identify untested parts of a software program. Along these lines, the conventional tool provides counts of the number of times each statement in the program is executed.

If the software developer wishes to exclude parts of the program from the test, the software developer may comment out those parts of the program before creating the binary from the source code. For example, using the C programming language, the software developer may comment out segments of the program by inserting comment indicators such as "/*" in front of the segments and "*/" at the end of the segments. When the software developer then creates the binary from the source code and runs the conventional tool, the commented out parts of the program will not exist within the binary so that no counting takes place for those parts of the program.

SUMMARY

Unfortunately, there are deficiencies to the above-described approach of excluding parts of a software program from a test by commenting out the parts before creating the binary and running the conventional tool. Along these lines, each time the software developer wishes to exclude a different part of the program from the test, the software developer must re-edit the source code to adjust the comment indicators (e.g., add, delete, move, etc. the placements of "/*" and "*/") and then re-create the binary from the re-edited source code. Such an approach is tedious, error prone, and runs the risk of using source code that accidentally contains other changes, etc.

Additionally, suppose that the software developer uses a mechanism that measures coverage of marked parts of source code during application testing. In such a situation, the software developer may manually insert pairs of markers within the source code to mark certain parts of the source code for coverage tracking. However, such manual insertion of pairs of markers is burdensome and prone to error (e.g., typos, location errors, etc.). For example, it is possible that the software developer may inadvertently interleave pairs of markers in an improper manner which could lead to generation of inaccurate and/or erroneous coverage data during application testing.

Furthermore, once the pairs of markers have been inserted within the source code, the pairs of markers tend to clutter the source code (e.g., the source code becomes untidy). That is, with the pairs of markers inserted within the source code, it is more difficult for the software developer to navigate, read, identify, etc. different parts of the source code (e.g., to find particular parts of the source code, to distinguish the markers from comments, etc.).

Moreover, once coverage tracking is no longer desired for the marked parts of the source code, the pairs of markers should be removed to unclutter the source code for perhaps new pairs of markers to mark other parts of the source code for coverage tracking. Unfortunately, such removal of pairs of markers from the source code is also burdensome and prone to error.

Improved techniques are directed to forming marked source code via smart/automated marking to ascertain application test coverage. Along these lines, a user may combine special metadata with output from a version control system that tags lines of source code with identifiers for version control. The special metadata indicates which tagged lines of source code are to be tracked for coverage. Accordingly, a specialized tool (or mechanism) may then smartly and automatically insert markers within a separate copy of the source code (accordingly referred to as marked source code) based on the output from the version control system and the special metadata. With the markers correctly in place, the marked source code may be tested, e.g., tracked with coverage results indicating whether and/or how often a particular section of code was executed, etc. during the test. Moreover, the marked source code does not need to be re-edited to remove markers since new marked source code may be generated based on the output from the version control system and new special metadata (e.g., the specialized tool may smartly and automatically insert new markers within a new separate copy of the source code).

One embodiment is directed to a method of ascertaining application test coverage. The method includes obtaining a source code identifier that identifies a source code section of unmarked source code for an application to be tested. The method further includes providing a relation that includes the source code identifier and a feature identifier that identifies a feature provided by the source code section of unmarked source code. The method further includes forming marked source code for the application to be tested from the relation and the unmarked source code. The marked source code for the application to be tested is testable to generate application test coverage results describing test coverage of the source code section.

Another embodiment is directed to electronic equipment which includes memory and control circuitry coupled with the memory. The memory stores instructions which, when carried out by the control circuitry, cause the control circuitry to perform a method of:

(A) obtaining a source code identifier that identifies a source code section of unmarked source code for an application to be tested, (B) providing a relation that includes the source code identifier and a feature identifier that identifies a feature provided by the source code section of unmarked source code, and (C) forming marked source code for the application to be tested from the relation and the unmarked source code, the marked source code for the application to be tested being testable to generate application test coverage results describing test coverage of the source code section.

Yet another embodiment is directed to a computer program product having a non-transitory computer readable medium which stores a set of instructions to ascertain application test coverage. The set of instructions, when carried out by computerized circuitry, causes the computerized circuitry to perform a method of:

(A) obtaining a source code identifier that identifies a source code section of unmarked source code for an application to be tested;

(B) providing a relation that includes the source code identifier and a feature identifier that identifies a feature provided by the source code section of unmarked source code; and (C) forming marked source code for the application to be tested from the relation and the unmarked source code, the marked source code for the application to be tested being testable to generate application test coverage results describing test coverage of the source code section.

In some arrangements, obtaining the source code identifier that identifies the source code section includes receiving an output from a version control system. The output includes multiple source code identifiers identifying lines of unmarked source code for the application to be tested. The source code identifier that identifies the source code section is among the multiple source code identifiers.

In some arrangements, receiving the output from the version control system includes after a first version of the unmarked source code has been outputted, acquiring a second version of the unmarked source code as the output.

In some arrangements, the first version of the unmarked source code includes the source code section of unmarked source code tagged with a first hexadecimal identifier. Additionally, acquiring the second version of the unmarked source code as the output includes acquiring the source code section of unmarked source code tagged with a second hexadecimal identifier that is different from the first hexadecimal identifier.

In some arrangements, providing the relation includes receiving, as the feature identifier, a name of the feature provided by the source code section, and generating a relation entry that pairs the source code identifier with the name of the feature.

In some arrangements, forming marked source code for the application to be tested from the relation and the unmarked source code includes creating a copy of the unmarked source code, the copy including the source code section and, based on the relation entry, inserting a pair of text-based markers into the copy to form the marked source code. The pair of text-based markers delineate the source code section included within the copy.

In some arrangements, the copy includes the source code section. Additionally, inserting the pair of text-based markers includes, based on the relation entry, inserting a first text-based marker as a first source code comment ahead of the source code section within the copy and a second text-based marker as a second source code comment after the source code section within the copy to delineate the source code section within the copy.

In some arrangements, the method further includes running a test procedure that operates the application on processing circuitry to generate section coverage data. The method further includes, after running the test procedure, generating application coverage results from the section coverage data, the application coverage results describing test procedure coverage of the source code section.

In some arrangements, running the test procedure includes launching the application on a test platform to run the application and, while the application is running on the test platform, inputting a set of test inputs to the application to exercise the application to generate at least some of the section coverage data.

In some arrangements, generating the application coverage results from the section coverage data includes providing a report that identifies a coverage measurement indicating an amount of the source code section that was tested.

In some arrangements, running the test procedure includes generating the section coverage data while the processing circuitry performs data storage operations to respond to host input/output (I/O) requests from a set of host computers.

In some arrangements, the method further includes, prior to running the test procedure, loading the application onto a test platform that includes the processing circuitry and a set of storage devices, the host I/O requests being configured to access the set of storage devices.

It should be understood that, in the cloud context, at least some electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry, test platforms, etc. which are involved in forming marked source code via smart/automated marking to ascertain application test coverage.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to forming marked source code via smart/automated marking of unmarked source code to ascertain application test coverage. Along these lines, a user may combine special metadata with output from a version control system that tags lines of the unmarked source code with identifiers for version control. The special metadata indicates which tagged lines of unmarked source code are to be tracked for coverage. Accordingly, a specialized tool may then smartly and automatically insert markers within a separate copy of the unmarked source code (now referred to as marked source code) based on the output from the version control system and the special metadata. With the markers correctly in place within the marked source code, the marked source code may be tested, e.g., tracked with coverage results indicating whether and/or how often a particular code section was executed during the test. Moreover, the marked source code does not need to be re-edited to remove markers since new marked source code may be generated based on the output from the version control system and new special metadata (e.g., the specialized tool may smartly and automatically insert new markers within a new separate copy of the unmarked source code). Accordingly, the unmarked source code remains uncluttered and the user is not burdened with editing the unmarked source code to place and/or remove markers.

Figure 1:
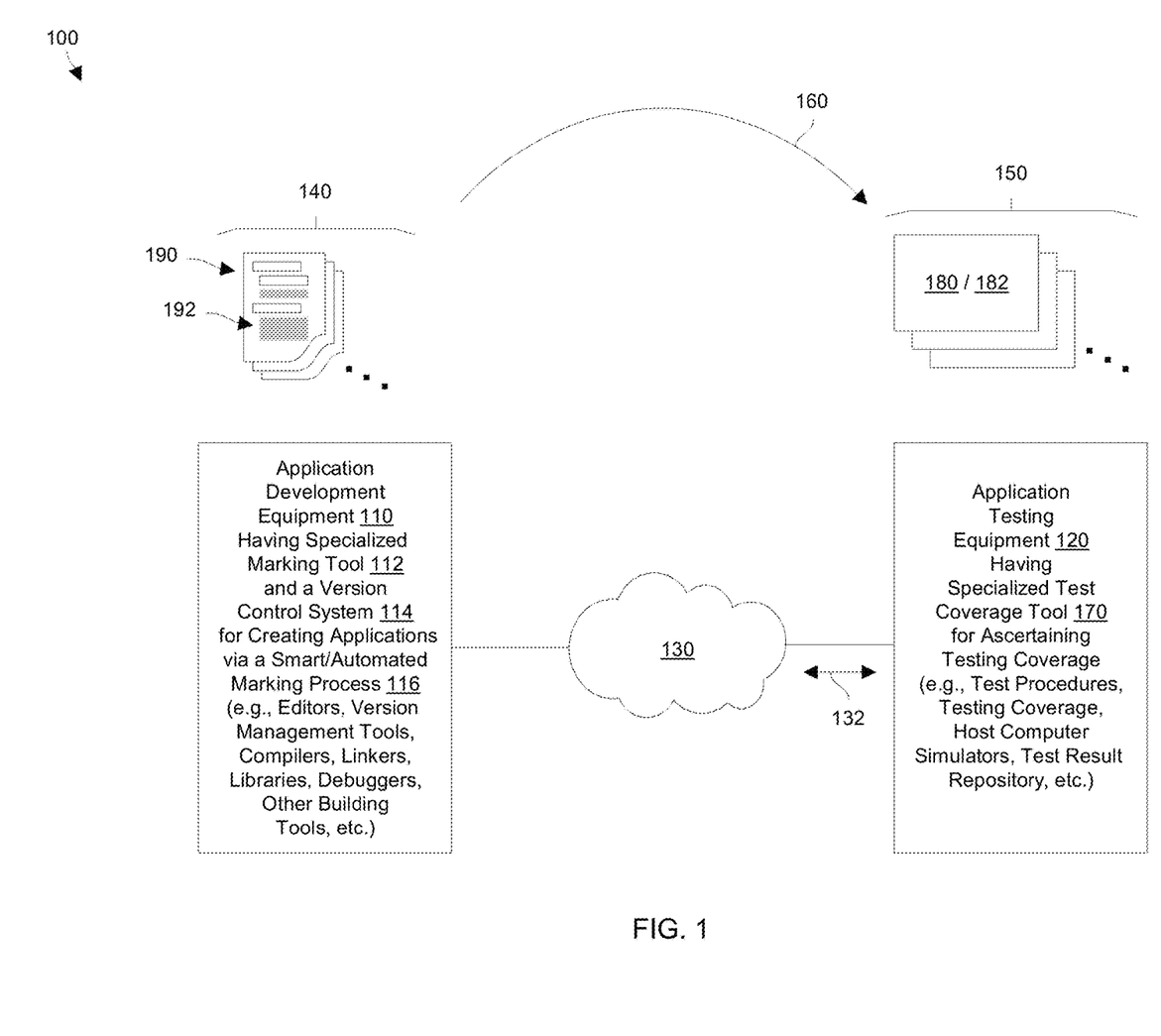
FIG. 1 is a block diagram of an electronic environment for developing and testing an application in accordance with certain embodiments.

FIG. 1 is a block diagram of an electronic environment 100 for developing and testing applications in accordance with certain embodiments. The electronic environment 100 includes application development equipment 110, application testing equipment 120, and communications media 130.

The application development equipment 110 is constructed and arranged to support development of software applications. Such development may include writing software code, editing or modifying the code, building binaries from the code, preliminary testing of the code, and so on. Accordingly, the application development equipment 110 may include resources such as editors, version management tools, compilers, linkers, a version control system, libraries, debuggers, other application building tools, etc. that enable software developers to create software applications.

As will be explained in further detail shortly, the application development equipment 110 has a specialized marking tool 112 and a version control system 114 to form marked source code to ascertain test coverage. Such a specialized marking tool 112 uses output from the version control system 114 to generate marked source code for an application via a smart/automated marking process 116. When the application is then built by the application development equipment 110 and tested by the application testing equipment 120, coverage of one or more source code sections can be tracked.

The application testing equipment 120 is constructed and arranged to test software applications. Such testing may include running test procedures that exercise applications, a specialized tool that ascertains testing coverage, host computer simulators, etc. Accordingly, the application testing equipment 120 may include resources such as processors, storage devices, communications interfaces, etc. that enable rich and reliable software application testing.

The communications media 130 is constructed and arranged to connect the various components of the electronic environment 20 together to enable these components to exchange electronic signals 132 (e.g., see the double arrow 132). The communications media 130 is illustrated as a cloud to indicate that the communications media 130 is capable of having a variety of different topologies including backbone, hub-and-spoke, loop, irregular, combinations thereof, and so on. Along these lines, the communications media 130 may include copper-based data communications devices and cabling, fiber optic devices and cabling, wireless devices, combinations thereof, etc. Furthermore, the communications media 130 is capable of supporting LAN-based communications, SAN-based communications, cellular communications, combinations thereof, etc.

In accordance with certain embodiments, at least some of the application development equipment 110 resides at different locations or sites (e.g., different offices or labs, different campuses, different cities, combinations thereof, etc.). In such a situation, one or more devices of the application development equipment 110 may communicate through the communications media 130.

In accordance with certain embodiments, at least some of the application testing equipment 120 resides at different locations or sites (e.g., different offices or labs, different campuses, different cities, combinations thereof, etc.). In such a situation, one or more devices of the application testing equipment 120 may communicate through the communications media 130.

In accordance with certain embodiments, at least some of the application development equipment 110 and at least some of the application testing equipment 120 share the same resources. Such resources may include processing circuitry, storage, user input/output equipment, combinations thereof, etc.

During operation, human application developers write source code 140 and build (or make) applications 150 from the source code 140 utilizing the application development equipment 110. Such source code 140 may include one or more files containing instructions (or statements) written in one or more software languages to form a variety of software constructs such as individual lines of code, routines, storage objects, libraries, and so on.

When an application 150 is ready for testing, the application 150 is transferred from the application development equipment 110 to the application testing equipment 120 (e.g., see arrow 160 in FIG. 1). Such a transfer may include additional configuration information, support files, and so on.

At the application testing equipment 120, the application 150 may be thoroughly tested (e.g., launched, exercised to generate test results, evaluated based on the test results to determine whether the application 150 operates properly, etc.). As part of such testing, the application testing equipment 120 has a specialized tool 170 which is constructed and arranged to measure and report testing completeness (e.g., how much of the application 150 is covered by the testing).

In accordance with certain embodiments, the application development equipment 110 equips the application 150 with specialized coverage analysis features. Such features may enable branch statistics to be recorded, line execution counts to be saved, and so on in a manner similar to gcov and/or lcov. Accordingly, the application 150 may include a variety of additional files (e.g., .bb, .bbg, .da, etc.) that enable proper statistics measuring and/or outputting (e.g., as an annotated source listing, for viewing on a graphical user interface, combinations thereof, etc.).

Along these lines, it will be explained in further detail shortly that the specialized tool 170 of the application testing equipment 120 enables testing coverage to be ascertained for unmarked sections 180 of an application 150 and/or marked sections 182 of the application 150. Such unmarked sections 180 correspond to unmarked code portions 190 (unshaded in FIG. 1) of the source code 140. Similarly, such marked sections 182 correspond to marked code portions 192 (shaded in FIG. 1) of the source code 140. Further details of the specialized tool 170 will be provided shortly.

In accordance with certain embodiments, the specialized tool 170 provides testing coverage results with file granularity. By way of example, suppose that the application 150 was created from five separate source code files. In such a situation, the testing coverage results will indicate testing coverage results for each source code file of the five separate source code files. For example, the testing coverage results may indicate that the first source code file received 87% testing coverage, the second source code file received 50% testing coverage, the third source code file received 70% testing coverage, and so on. Other numbers of files are suitable, and other testing coverage results are possible.

In accordance with certain embodiments, the specialized tool 170 provides testing coverage results with source code section granularity. Along these lines, the source code in a particular one of the files may include one or more unmarked sections 190 of source code and one or more marked sections 192 of source code. Here, the testing coverage results will indicate testing coverage results for each unmarked section 190 and/or marked section 192 of source code. Other variations are suitable for use as well as such as marking one or more source code sections in a first file, marking one or more source code sections in a second file, and so on.

In some embodiments, the application development equipment 110 and the application testing equipment 120 are co-located and/or tightly integrated to enable the application developers to more easily transition between source code writing and application testing. In a particular embodiment, the application development equipment 110 and the application testing equipment 120 resides on a single platform. In another embodiment, the application development equipment 110 and the application testing equipment 120 are distributed across multiple locations/devices/apparatus/etc.

In a particular use case, the applications 150 that are developed within the electronic environment 100 are data storage applications that perform data storage operations on behalf of host computers, and associated management tools. Accordingly, the application testing equipment 120 may include specialized hardware such as storage processors, storage devices, and so on. Further details will now be provided with reference to FIGS. 2 through 5.

Figure 2:
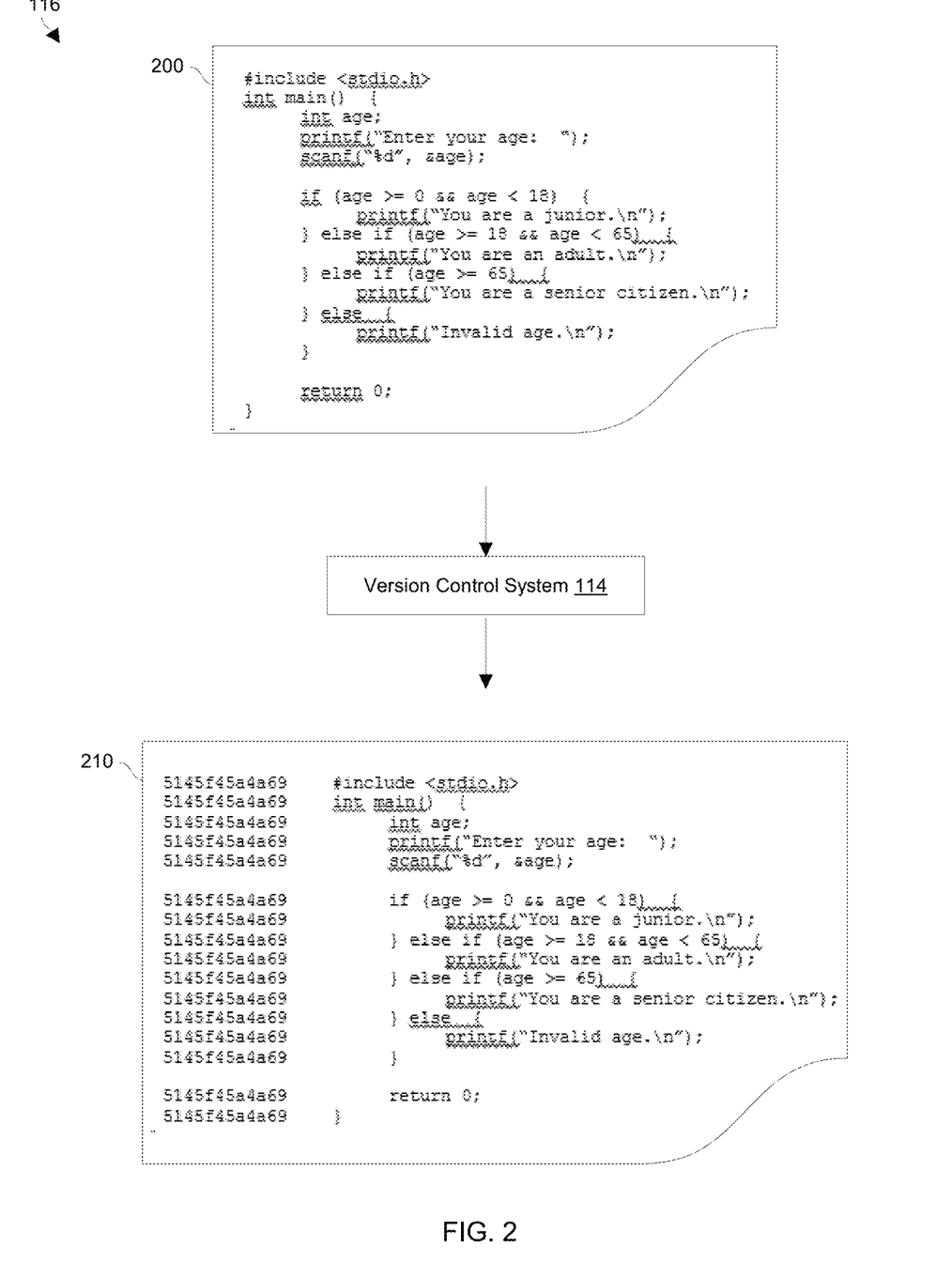
FIG. 2 is a block diagram of certain activity in which unmarked source code is tagged in accordance with certain embodiments.
Figure 3:
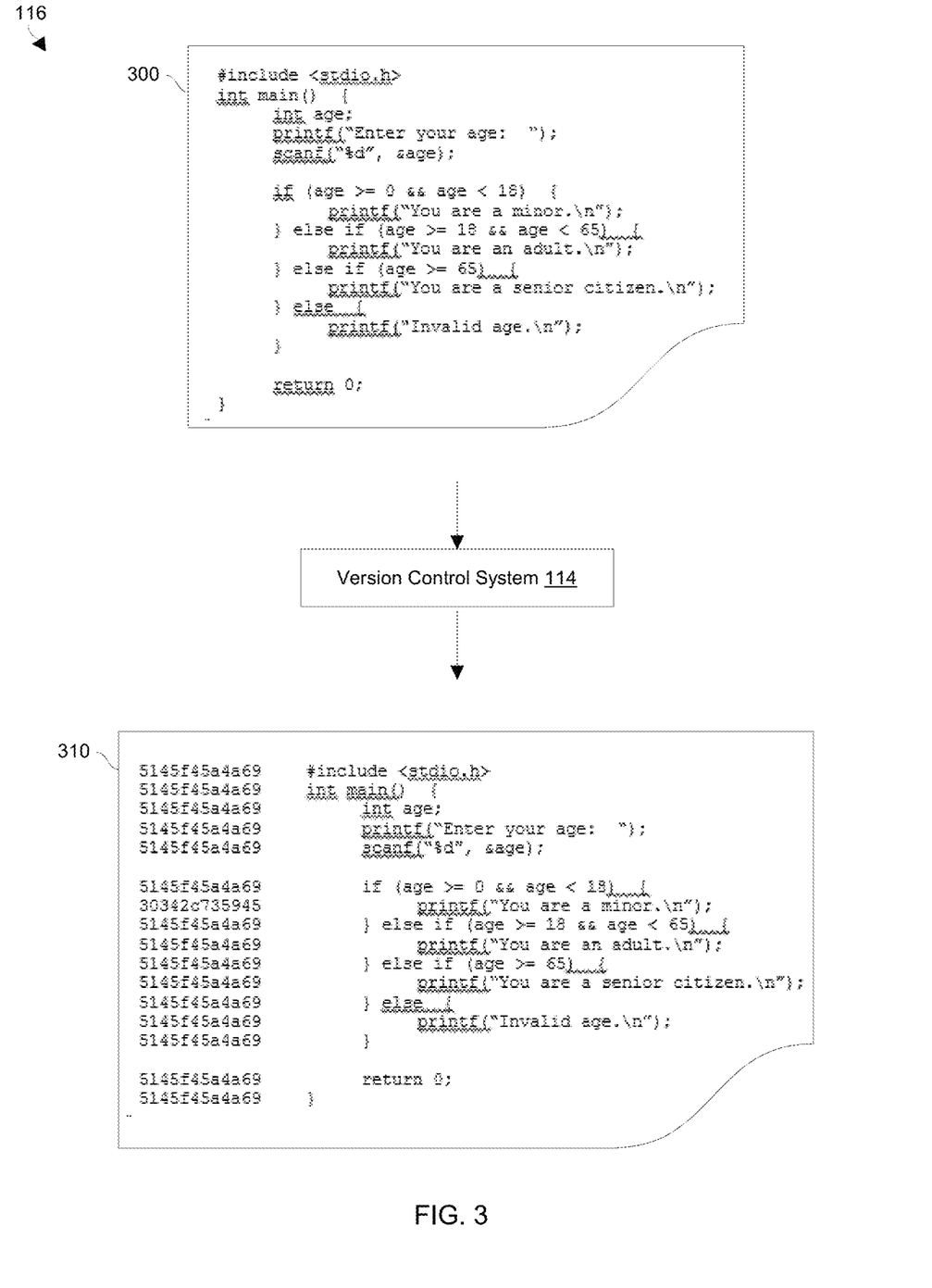
FIG. 3 is a block diagram of certain activity in which unmarked source code is modified and then tagged in accordance with certain embodiments.
Figure 4:
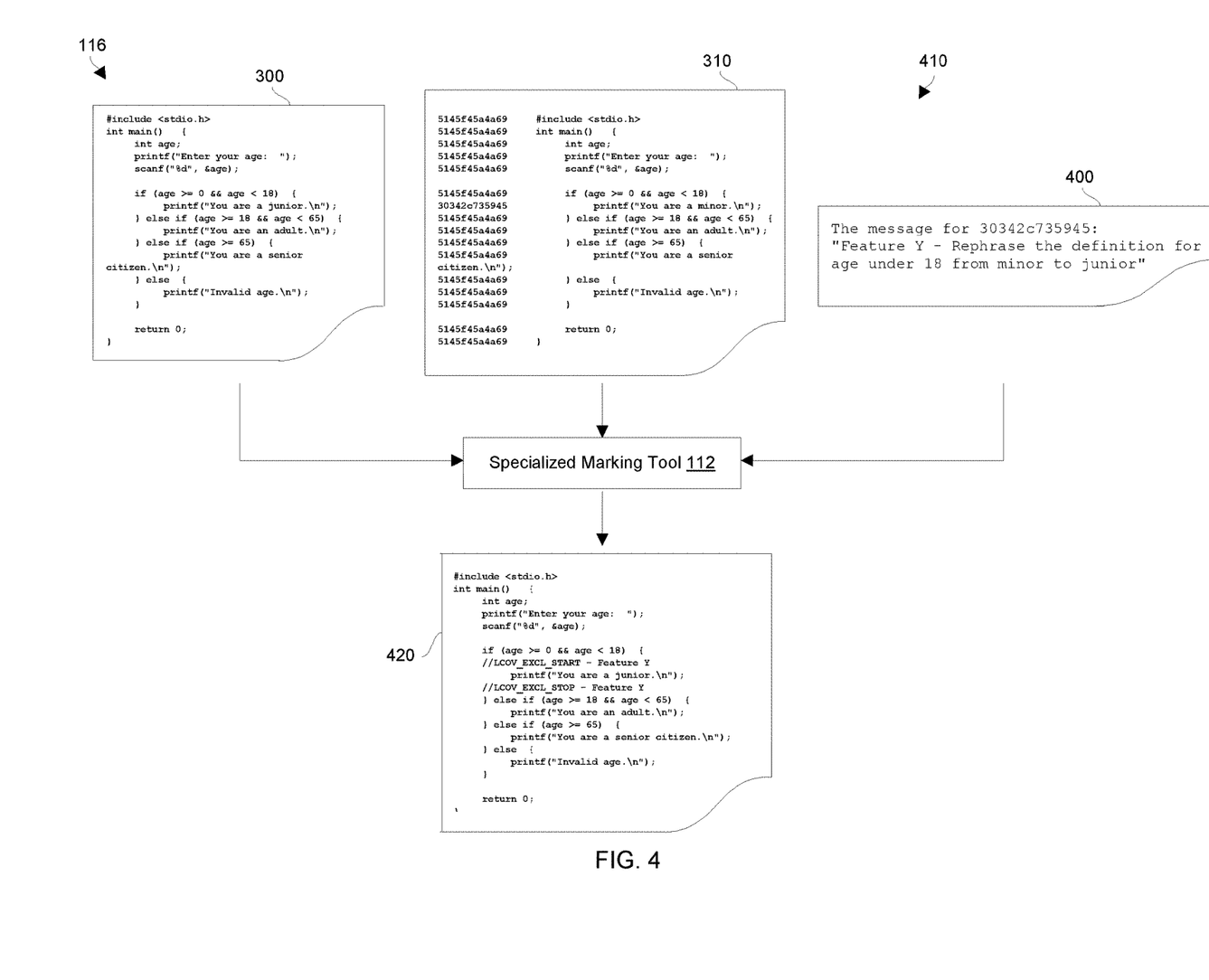
FIG. 4 is a block diagram of certain activity in which marked source code is generated in accordance with certain embodiments.
Figure 5:
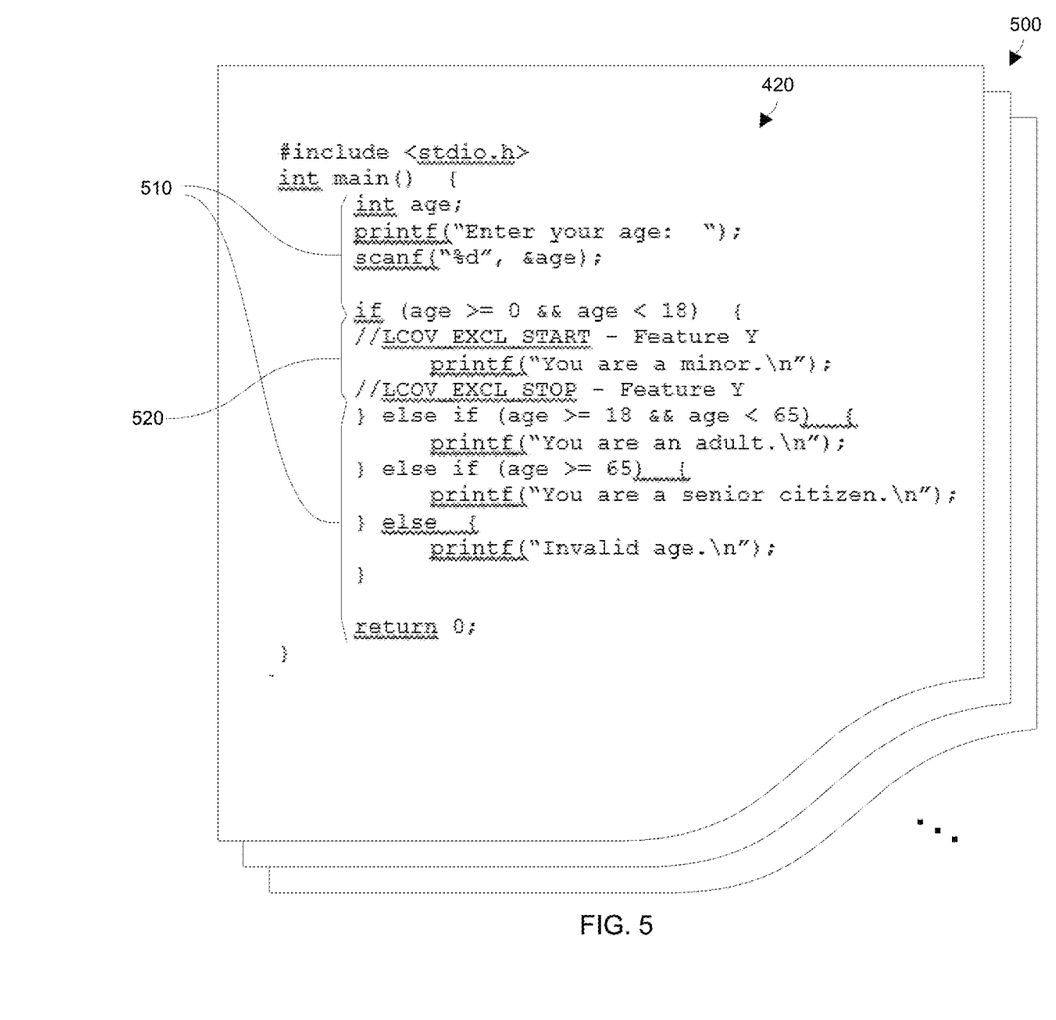
FIG. 5 shows certain details of the marked source code in accordance with certain embodiments.

FIGS. 2 through 5 show particular details for the smart/automated marking process 116 which forms marked source code via smart/automated marking of unmarked source code in accordance with certain embodiments. FIG. 2 shows a portion of the process 116 in which the unmarked source code is tagged. FIG. 3 shows a portion of the process 116 in which the unmarked source code is modified and then tagged. FIG. 4 shows a portion of the process 116 in which marked source code is generated. FIG. 5 shows certain details of the marked source code.

As shown in FIG. 2, the smart/automated marking process 116 involves the application of tags to unmarked source code 200 to create tagged unmarked source code 210. Along these lines, the unmarked source code 200 may be stored within a first set of files (i.e., one or more files), and the tagged unmarked source code 210 may be stored in a second set of files.

In some arrangements, the smart/automated marking process 116 uses the version control system 114 to tag the unmarked source code 200. In other arrangements, the smart/automated marking process 116 uses one or more other tagging mechanisms such as scripts, built-in software development features of a software development platform, combinations thereof, etc. By way of example, all of the source code within the unmarked source code 200 are new lines of code and are thus tagged with the same version tag such as "5145f45a4a69". Here, the version control system 114 outputs unique identifiers for code sections that are uploaded/saved/etc. at different times.

It should be appreciated that it is not necessary to build an actual application from the tagged unmarked source code 210. Rather, the unmarked source code 200 may be used to build an actual application and the tagged unmarked source code 210 may be used simply as metadata.

Along these lines and in accordance with certain embodiments, the tagged unmarked source code 210 may be viewed as a form of metadata that is output from the version control system 114 to identify which lines of source code have been modified relative to other lines of source code. For example, if all of the lines of source code in the tagged unmarked source code 210 have the same version tag such as "5145f45a4a69", the version control system 114 views all the lines of source code as belonging to the same source code version. However, when a line of source code is later modified or added, the version control system 114 will then provide a new tag to the modified and/or added lines of source code such that the new tag identifies source code for a new version.

As will be more apparent shortly, the smart/automated marking process 116 uses the same version tags within the tagged unmarked source code 210 as source code identifiers to identify sections of the unmarked source code 210 for marking. That is, the smart/automated marking process 116 may treat the tagged unmarked source code 210 as metadata as well. As shown in FIG. 2, there is only one section of unmarked source code 210 since all of the lines of source code have the same tag.

Now, suppose that a user accesses the unmarked source code 210 to modify one or more existing lines of source code and/or to add new lines of source code. Here, the user may edit source code using user input/output (I/O) equipment. At some point, the user saves this work as new unmarked source code 300 (e.g., a new version).

As shown in FIG. 3, the smart/automated marking process 116 involves the application of tags to new unmarked source code 300 to create tagged unmarked source code 310. Here, the unmarked source code 300 may be stored among the earlier-mentioned first set of files, and the tagged unmarked source code 310 may be stored among the earlier-mentioned second set of files.

By way of example and as shown in FIG. 3, in the unmarked source code 300, the user has changed one line of source code from:

printf ("You are a junior.\n");

to printf ("You are a minor.\n");

and then saved the changes.

In some arrangements, the smart/automated marking process 116 uses the version control system 114 to update the tags in the tagged unmarked source code 310. In other arrangements, the smart/automated marking process 116 uses one or more other tagging mechanisms (e.g., a scripts, a built-in software development feature, etc.) to update the tags.

By way of example and as shown in FIG. 3, the original source code remains tagged with the original version tag (i.e., "5145f45a4a69"). However, the changed source code is tagged with a new version tag such as "30342c735945". Accordingly, there are now multiple sections of unmarked source code 310 since the lines of source code now have different tags (e.g., "5145f45a4a69" vs. "30342c735945").

At this point, the smart/automated marking process 116 is ready to receive further metadata (e.g., a message) that identifies one or more source code sections for marking. Along these lines, a user may provide (or enter) one or more relations to the smart/automated marking process 116 for smart/automated source code marking. Such marking metadata may be provided via user I/O equipment, e.g., by entering the marking metadata as a set of relations into a set of files.

Along these lines and as shown in FIG. 4, the user provides a relation 400 that includes a source code identifier and a feature identifier that identifies a feature provided by the source code section of unmarked source code. In particular, the source code identifier is a version tag which has been applied to one or more source code lines, and the feature is a name (or at least part of text-based description or message) for the feature. The relation 400 may be stored in a third set of files (i.e., a set of files that is different from the first set of unmarked source code files and the second set of tagged unmarked source code files).

By way of example, the relation 400 is as follows:
The message for 30342c735945:
"Feature Y—Rephrase the definition for age under 18 from minor to junior"

Here, "30342c735945" is the source code identifier, and "Feature Y" is the feature name. In accordance with certain embodiments, the specialized marking tool 112 is configured to parse the message "Feature Y-Rephrase the definition for age under 18 from minor to junior" such as based on the hyphen "-" to obtain (or extract) the feature name from the message.

The user may similarly provide other relations 400 to mark other source code sections as well. In this situation, different version tags may have been applied to identify different sections of the tagged unmarked source code 310. Accordingly, the different relations enable marking of the different source code sections.

As further shown in FIG. 4, the specialized marking tool 112 then takes various information 420 as input to smartly generate marked source code 420. In some arrangements, the various information includes the unmarked source code 300, the tagged unmarked source code 310, and the relation 400. However, in other arrangements, the unmarked source code 300 is unnecessary and not included since all of the source code lines are available within the tagged unmarked source code 310.

FIG. 5 shows a set of source code files 500 which includes smartly marked source code 420 generated by the specialized marking tool 112 (also see FIG. 4). In particular, the set of source code files 500 contains one or more unmarked code portions 510 and one or more marked code portions 520. The particular instructions of the unmarked code portions 510 and marked code portions 520 are provided by way of example only.

Among the unmarked code portions 510 and marked code portions 520 within the set of source code files 500, there may be comments. However, it should be understood that such comments are different from the unmarked code portions 510 and the marked code portions 520. For example, the comments do not convert into any run time operations, while both the unmarked code portions 510 and the marked code portions 522 convert into run time operations.

As shown in FIG. 5, the marked code portion 520 is as follows:

```
// LCOV_EXCEL_START - Feature Y
   printf("You are a minor.\n");
// LCOV_EXCEL_STOP - Feature Y
```

The marked code portion 520 includes, as a pair of markers, a starting marker, code for a set of application operations, and an ending marker.

In particular, the starting marker is
"LCOV_EXCEL_START—Feature Y".
"LCOV_EXCEL_START" is a keyword identifying this object as a starting marker.
The code for the set of application operations is
printf("You are a minor.\n");
Such code may perform useful work.
Additionally, the ending marker is
"LCOV_EXCEL_STOP—Feature Y".
"LCOV_EXCEL_STOP" is a keyword identifying this object as an ending marker.

The keyword term (or subterm) "LCOV_EXCEL" signifies that this is part of a specialized marker used to demarcate code for the specialized tool 170 (also see FIG. 1). The keyword terms "START" and "STOP" indicate whether the specialized marker begins a marked portion of source code or ends a marked portion of source code.

At this point, it should be understood that the starting marker and the ending marker form a marker pair that delineates the marked code portion 520. It should be understood that both the first starting marker and the first ending marker include "Feature Y" which uniquely identify the marker pair among other possible marker pairs within the source code 410.

Although the example in FIG. 5 includes only one marked section 520, the marked source code 510 may include more than one marked section 520 (e.g., two, three, four, ten, twenty, etc.). In accordance with certain embodiments, such marked sections 520 are non-overlapping and uniquely identified by the unique identifiers.

It should be further understood that the markers reside immediately after comment symbols (e.g., "//") in accordance with certain embodiments. Accordingly, a standard compiler ignores the markers as simply comments. However, the markers do convert into operations during run time. In some embodiments, an enhanced compiler (or build tool) generates executable code which is embedded within the executables. In other embodiments, the specialized tool 170 walks through the execution of the application 150 in locked step with the source code 140 during counting and processes the markers when the specialized tool 170 encounters the markers in the source code 140.

It should be further understood that the hyphen "-" is provided by way of example as a delimiter that separates the marker keyword portion of the markers with the unique identifier portion of the markers that identify marker pairs. Other delimiters and/or delimiting/parsing mechanisms are suitable for use as well.

It should also be noted that the source code 140 includes a set of unmarked code portions 510. Such unmarked code portions 510 simply include code which is not delineated by markers. That is, an unmarked code portion 510 is part of the source code 140 is not marked (or excluded) via markers. Further details will now be provided with reference to FIG. 6.

Figure 6:
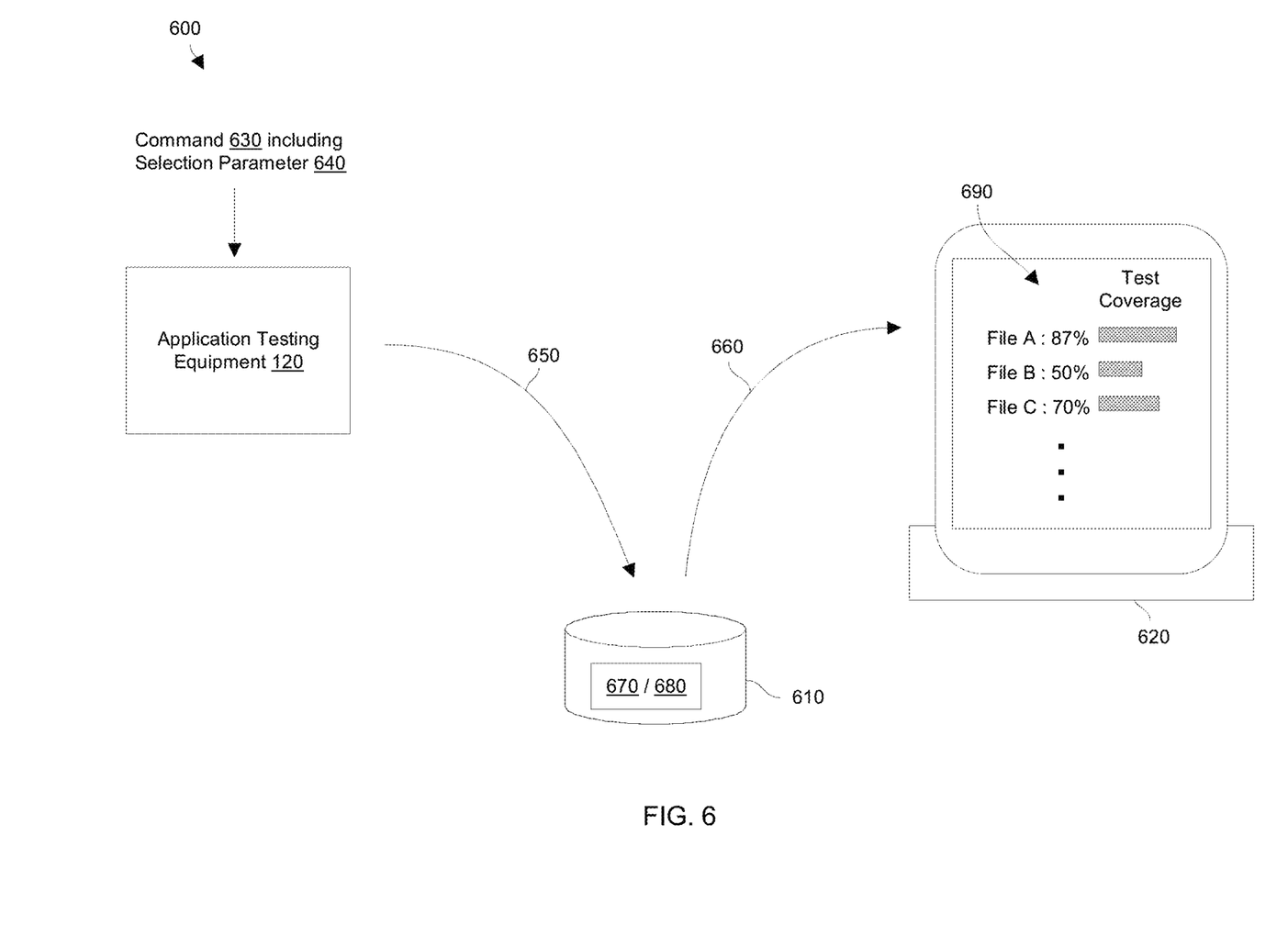
FIG. 6 shows a process of providing test coverage results in accordance with certain embodiments.

FIG. 6 illustrates a process 600 performed by the specialized tool 170 to provide insights as to whether the application 150 has been properly tested and/or whether the application 150 operates properly in accordance with certain embodiments. Along these lines, the specialized tool 170 generates and processes test coverage results to identify degrees (or amounts) of untested instructions (or statements) of an application 150 in accordance with certain embodiments. Such operation does not require any re-editing and/or and re-building of the application 150 to analyze testing coverage of different application sections.

The process 600 involves the application testing equipment 120 (also see FIG. 1), a test result repository 610, and an output device 620. In some arrangements, the test result repository 610 and the output device 620 may be considered part of the application testing equipment 120. In other arrangements, the test result repository 610 and the output device 620 may be considered separate (or external) from the application testing equipment 120 (e.g., in which the results are saved and later evaluated remotely from the application testing equipment 120).

To initiate the process 600, a user provides a command 630 to the application testing equipment 120 to initiate the process 600. The command 630 includes a selection parameter 640 that requests particular coverage results. Such coverage results may include coverage results for a set of unmarked sections 510 of the application 150, a set of marked sections 520 of the application 150, or both (also see FIG. 5).

For example, the command 630 may include, as the selection parameter 640, a command line option such as "-marked" to request coverage results for all marked (or excluded) sections 520 of the application 150. As another example, the command 630 may include, as the selection parameter 640, a command line option such as "-unmarked" to request coverage results for all unmarked sections 510 of the application 150. As yet another example, the command 630 may include, as the selection parameter 640, a command line option such as "-both" to request coverage results for both unmarked sections 510 and marked sections 520 of the application 150.

In accordance with some embodiments, the selection parameter 640 may identify a particular marked section 520 of the application with specificity. For example, suppose that the source code 140 includes a marker pair which is identified by the marker identifier "Feature Y". To specifically request coverage results for that marker pair, the command 630 may include, as the selection parameter 640, a command line option such as "-marked-section_Feature_Y" to request coverage results for the part of the application 150 corresponding to the portion of the source code 140 delineated by that marker pair.

It should be understood that the above-provided examples for the selection parameter 640 are merely illustrative and by way of example only. Other parameter formats, selection mechanisms, etc. are suitable for use as well.

As shown in FIG. 6, the process 600 involves multiple phases 650, 660. During the phase 650 (e.g., see the arrow 650), the application test equipment 120 runs a test procedure that operates the application 150 (e.g., runs the application 150). Such a test procedure may include test routines/scripts/test input data/test input parameters/etc. that exercise the different sections/features of the application 150. During such testing, test result data 670 is recorded (or captured) within the test result repository 610.

At least some of the test result data 670 includes section coverage data 680 which indicates how many times corresponding instructions of the source code 140 were executed when the test procedure tests the application 150 (e.g., line execution counts). In some arrangements, at least some of the test result data resides within a logfile of the test result repository 610.

During the phase 660 (e.g., see the arrow 660), the application test equipment 120 generates testing coverage results 690 from the section coverage data 680. Along these lines, the testing coverage results 690 describes test procedure coverage of at least one of the set of unmarked sections 180 of the application 150 and the set of marked sections 520 of the application 150.

In some embodiments, the specialized tool 170 provides the testing coverage results 690 with per file granularity. By way of example, FIG. 6 shows the testing coverage results 690 as indicating that 87% of the source code from File A was covered by the test procedure, 50% of the source code from File B was covered by the test procedure, 70% of the source code from File C was covered by the test procedure, and so on.

In some embodiments, the specialized tool 170 provides the testing coverage results 690 with per section granularity. For example, the testing coverage results 390 as indicating that X % of the source code from section A was covered by the test procedure, Y % of the source code from section B was covered by the test procedure, and so on.

In some embodiments, the testing coverage results 690 may be displayed via a graphical user interface (GUI). In some embodiments, the test coverage results 690 may be outputted or rendered in a text-based format for easy display and/or file storage.

In accordance with certain embodiments, the test coverage results 690 may include a report that excludes marked sections 520 (e.g., generated using "-unmarked" as the selection parameter). Such an exclusion report is as follows:

```
FN:2,main
FNDA:1,main,
FNF:1
FNH:1
DA:2,1
DA:4,1
DA:5,1
DA:6,1
DA:13,1
DA:14,1
LF:6
LH:6
end_of_record
```

In accordance with certain embodiments, the test coverage results 690 may include a report that only includes marked sections 520 (e.g., generated using "-marked" as the selection parameter). Such an inclusion report is as follows:

```
DA:9,1
DA:10,0
LF:2
LH:0
end_of_record
```

In accordance with certain embodiments, the test coverage results 690 may include a report that includes both and unmarked sections 510 and the marked sections 520 (e.g., generated using "-both" as the selection parameter). Such a report is as follows:

```
FN:2,main
FNDA:1,main,
FNF:1
FNH:1
DA:2,1
DA:4,1
DA:5,1
DA:6,1
DA:9,0
DA:10,0
DA:13,1
DA:14,1
LF:8
LH:6
end_of_record
```

Such reports demonstrate the impact of using marker pairs with the specialized tool 170. Further details will now be provided with reference to FIG. 7.

Figure 7:
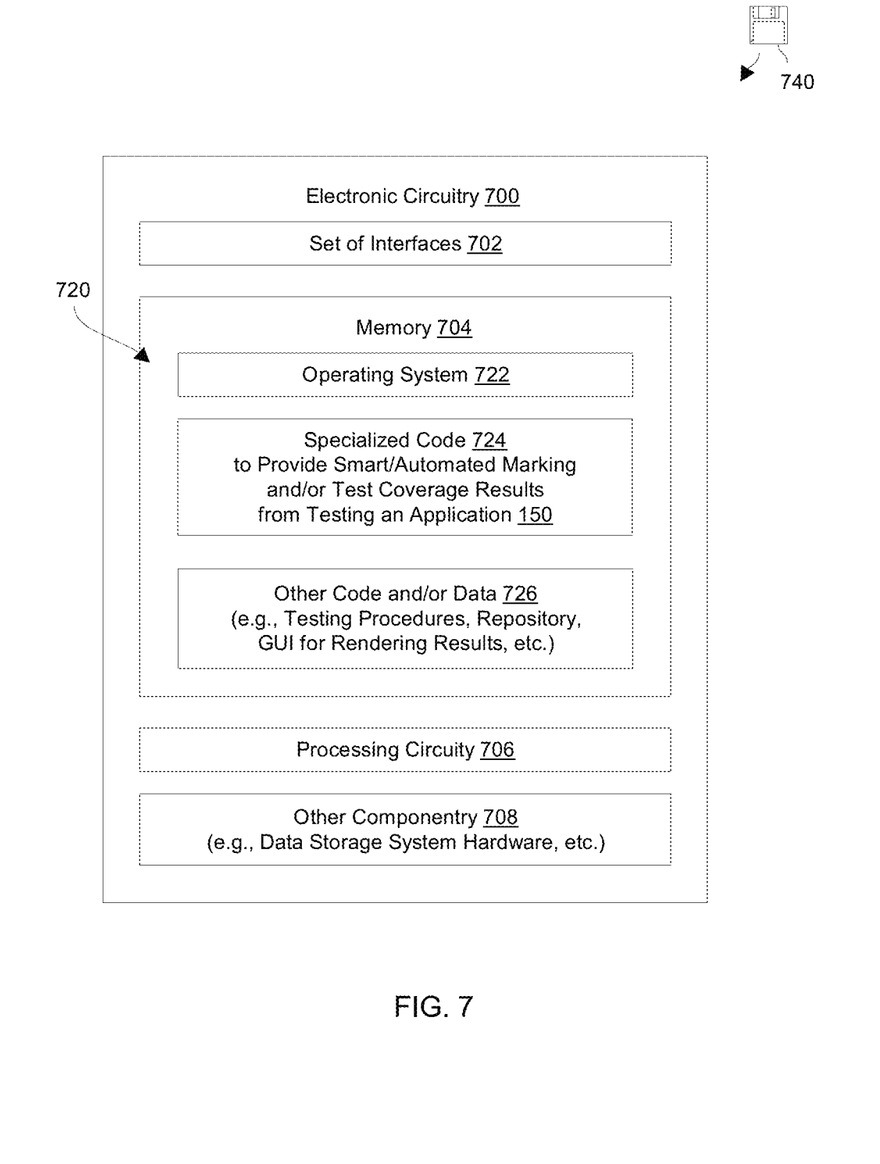
FIG. 7 is a block diagram of electronic circuitry which is suitable for use in accordance with certain embodiments.

FIG. 7 is a block diagram of electronic circuitry 700 which is suitable for at least a portion of the application development equipment 110 and/or the application testing equipment 120 (also see FIG. 1) in accordance with certain embodiments. The electronic circuitry 700 includes a set of interfaces 702, memory 704, processing circuitry 706, and other circuitry 708.

The set of interfaces 702 is constructed and arranged to connect the electronic circuitry 700 to the communications medium 130 (FIG. 1) to enable communications with other devices of the electronic environment 100. Such communications may be IP-based, SAN-based, cellular-based, cable-based, fiber-optic based, wireless, cloud-based, combinations thereof, and so on. Additionally, the set of interfaces 702 is constructed and arranged to connect the electronic circuitry 700 other local equipment. Accordingly, the set of interfaces 702 may include one or more host interfaces (e.g., a computer network interface, a fibre-channel interface, etc.), one or more storage device interfaces (e.g., a host adapter or HBA, etc.), and other interfaces. As a result, the set of interfaces 702 enables the electronic circuitry 700 to robustly and reliably communicate with various apparatus.

The memory 704 is intended to represent both volatile storage (e.g., DRAM, SRAM, etc.) and non-volatile storage (e.g., flash memory, magnetic memory, etc.). The memory 704 stores a variety of software constructs 720 including an operating system 722, specialized code 724, and other code and data 726. The operating system 722 refers to particular control code such as a kernel to manage computerized resources (e.g., processor cycles, memory space, etc.), the I/O stack (e.g., drivers), and so on. The specialized code 724 refers to particular instructions for smart/automated marking of source code and providing testing coverage results from testing an application 150 derived from the source code. The other code and data 726 refers to applications and routines to provide additional operations and services such as testing procedures that test applications 150, a repository for saving testing results, a GUI for rendering testing results, and so on.

The processing circuitry 706 is constructed and arranged to operate in accordance with the various software constructs 720 stored in the memory 704. Along these lines, the processing circuitry 706 executes the specialized code 724 to form one or more specialized tools 170 that robustly and reliably provides testing coverage results describing testing coverage from performing a test procedure on an application 150. Such processing circuitry 706 may further execute the specialized code 724 to perform smart/automated marking of unmarked source code coverage testing. Such processing circuitry 706 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 740 is capable of delivering all or portions of the software constructs 720 to the electronic circuitry 700. In particular, the computer program product 740 has a non-transitory (or non-volatile) computer readable medium which stores a set of instructions that controls one or more operations of the electronic circuitry 700. Examples of suitable computer readable storage media include tangible articles of manufacture and apparatus which store instructions in a non-volatile manner such as DVD, CD-ROM, flash memory, disk memory, tape memory, and the like.

The other componentry 708 refers to other hardware of the electronic circuitry 700. Along these lines, the electronic circuitry 700 may further include specialized equipment such as data storage system hardware when the application 150 under test is data storage equipment that processes host I/O requests on behalf of a set of host computers. Further details will now be provided with reference to FIG. 8.

Figure 8:
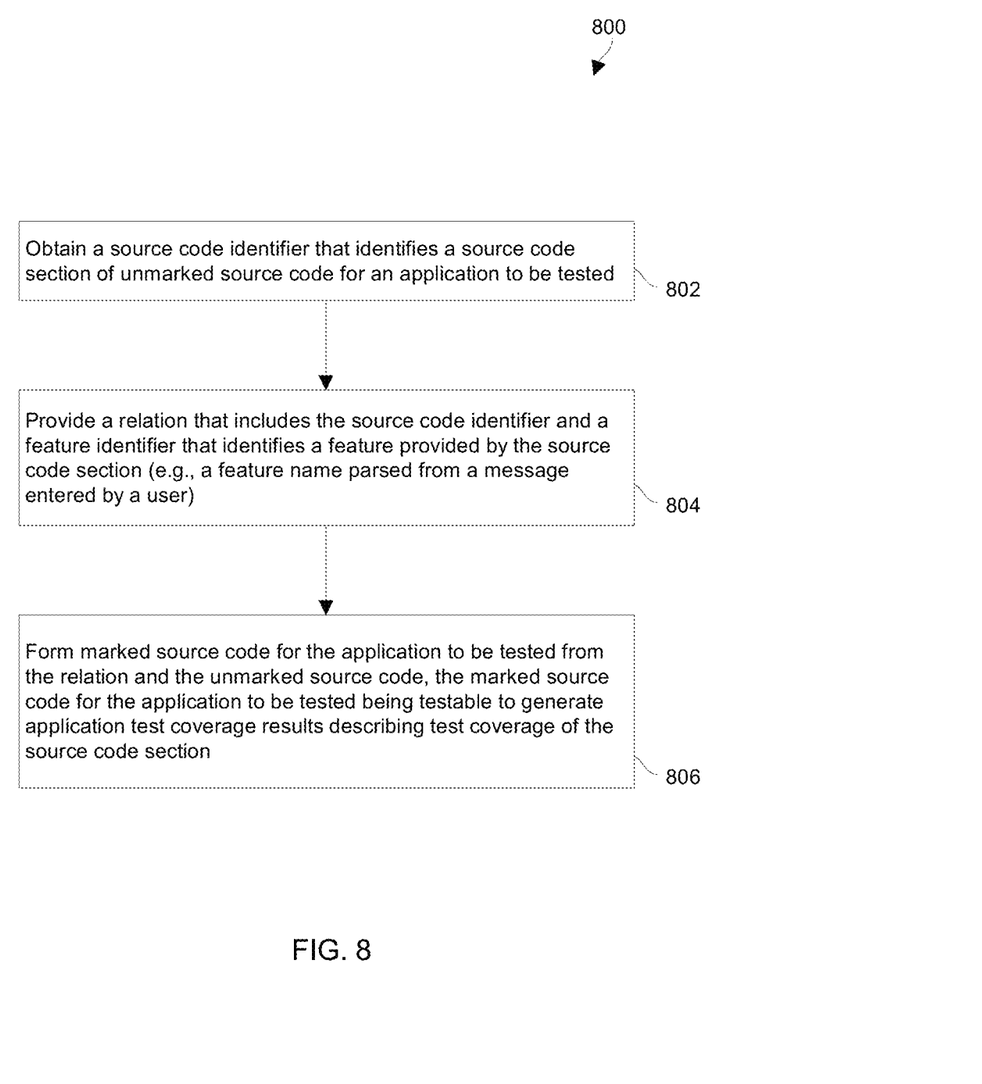
FIG. 8 is a flowchart of a procedure which is performed in accordance with certain embodiments.

FIG. 8 is a flowchart of a procedure 800 which is performed by specialized circuitry. Such specialized circuitry forms marked source code via smart/automated marking to ascertain application test coverage in accordance with certain embodiments.

At 802, the specialized circuitry obtains a source code identifier that identifies a source code section of unmarked source code for an application to be tested. Along these lines, the source code identifier may be a version tag that is provided by a version control system (also see FIGS. 1 through 3) thus alleviating the need for a user to manually provide the source code identifier.

At 804, the specialized circuitry provides a relation that includes the source code identifier and a feature identifier that identifies a feature provided by the source code section of unmarked source code. Along these lines, the feature identifier may be a feature name which is parsed from a message entered by a user. The specialized circuitry then provides the relation along with source code that has been tagged with the source code identifier for smart marking of the source code.

At 806, the specialized circuitry forms marked source code for the application to be tested from the relation and the unmarked source code. The marked source code for the application to be tested is testable to generate application test coverage results describing test coverage of the source code section (also see FIG. 6).

It should be understood that multiple sections of source code may be marked via multiple relations. Here, the relations include different source code identifiers and different feature identifiers (e.g., different feature names parsed from different messages entered by one or more users).

It should be appreciate that, since the marked source code is automatically generated (e.g., see FIG. 4), there is no risk of error (e.g., typos, location errors, etc.). Additionally, there is no risk of inadvertently interleaving pairs of markers in an improper manner which could otherwise lead to generation of inaccurate and/or erroneous coverage data during application testing.

Additionally, it should be appreciated that the original unmarked source code may remain unmarked. Accordingly, markers do not clutter the unmarked source code making it difficult read and discern other comments.

Furthermore, once coverage tracking is no longer desired for the marked parts of the source code, the markers do not need to be removed to unclutter the source code for perhaps new pairs of markers to mark other parts of the source code for coverage tracking. Rather, new marked source code may be generated from the unmarked source code and new relations provided by a user (also see FIG. 4).

As described above, improved techniques are directed to forming marked source code 420 via smart/automated marking to ascertain application test coverage. Along these lines, a user may combine special relation metadata 400 with output 310 from a version control system 114 that tags lines of source code with identifiers for version control. Such metadata 400 indicates which tagged lines of source code are to be tracked for coverage. Accordingly, a specialized tool (or mechanism) 112 may then smartly and automatically insert markers within a separate copy of the source code (accordingly referred to as marked source code 420) based on the output 310 from the version control system 114 and the special relation metadata 400. With the markers correctly in place, the marked source code 420 may be tested, e.g., tracked with coverage results indicating whether and/or how often a particular section of code was executed, etc. during the test. Moreover, the marked source code 420 does not need to be re-edited to remove markers since new marked source code 420 may be generated based on the output 310 from the version control system 114 and new special metadata 400 (e.g., the specialized marking tool 112 may smartly and automatically insert new markers within a new separate copy of the source code).

One should appreciate that the above-described techniques do not merely collect and process data. Rather, the disclosed techniques involve improvements to certain technologies such as those that test applications. With such techniques, various advantages are available as well such as obtaining test coverage results for different sections of an application without having to rebuild the application from source code each time, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 100 such as a portion of the application development equipment 110 and/or a portion of the application testing equipment 120 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that, in agile methodology, a feature is a service or function of the product that delivers business value and fulfills the customer's need and is delivered by a developer once the conditions and criteria that a software product must satisfy are met.

An important criteria to meet is the level of the feature code coverage. Along these lines, while developing a new feature, developers use code coverage tools to analyze their code to help create more efficient, faster-running code and to discover untested parts of their programs. In addition to that, as part of the development process, the organization requires to create a code coverage report for feature code.

Although manually added extended content exclusion markers enable the developer to mark new code that is related to a specific feature, it will lead to the following problems:

Markers from different code changes in time might interleave and will cause complexity of managing the marker and will lead to unexpected behavior of code coverage tool.

Comments (notes in code that don't have any effect on the running program) in source code, are used as markers, and when many features-related markers will be used, source code tidiness will become a concern, as those comments will only be used by code coverage tools and not by the developers.

Hence, a developer will NOT be able to:

Mark the feature-related code without validating that there are no interleaved notes that related to the code coverage markers.

Examine, debug, and review the source code, as many makers related to many different features content will appear in the source code.

However, in accordance with certain embodiments disclosed herein, there is source code file metadata usage to save the information of the relation between each line of source code to a feature. Along these lines, using source code file metadata, a developer is able to:

Prevent interleaving markers that will impact code coverage results.

Keep the source code readable without any code coverage markers related to specific feature content.

Eliminate the need to remove feature-related code coverage markers from source code once the feature is approved and its functionality is enabled, Mark feature content code during the testing process without making any changes to the program source code.

In accordance with certain embodiments, using the relation between the source code lines and their related feature enables easy marking of feature code at any time and creation of a report per feature.

In some embodiments, lines of source code are automatically labeled or tagged by a version control system. Examples of suitable version control systems include git, Apache SVN, and the like. Such tag/label metadata may then be utilized for smart source code marking. Along these lines, such version control allows storage (in a local or remote place) the relation between every line in source code to its related feature as part of the file metadata. Similarly, such version control stores the code owner and perhaps other details for each line.

In accordance with certain embodiments, the smart marking mechanisms that are disclosed herein enable marking source code prior to different feature tests. Such smart marking is cleaner (e.g., does not clutter the source code and does not require removal), and makes software development/testing easier.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of ascertaining application test coverage, comprising:

obtaining a source code identifier that identifies a source code section of unmarked source code for an application to be tested;

providing a relation that includes the source code identifier and a feature identifier that identifies a feature provided by the source code section of unmarked source code; and forming marked source code for the application to be tested from the relation and the unmarked source code, the marked source code for the application to be tested being testable to generate application test coverage results describing test coverage of the source code section, wherein the forming includes inserting a pair of text-based markers into a copy of the unmarked source code to form the marked source code by delineating the marked source between the text-based markers within a copy of the unmarked source code.

2. The method of claim 1 wherein obtaining the source code identifier that identifies the source code section includes:
receiving an output from a version control system, the output including multiple source code identifiers identifying lines of unmarked source code for the application to be tested, the source code identifier that identifies the source code section being among the multiple source code identifiers.

3. The method of claim 2 wherein receiving the output from the version control system includes:
after a first version of the unmarked source code has been outputted, acquiring a second version of the unmarked source code as the output.

4. The method of claim 3 wherein the first version of the unmarked source code includes the source code section of unmarked source code tagged with a first hexadecimal identifier; and
wherein acquiring the second version of the unmarked source code as the output includes:
acquiring the source code section of unmarked source code tagged with a second hexadecimal identifier that is different from the first hexadecimal identifier.

5. The method of claim 1 wherein providing the relation includes:
receiving, as the feature identifier, a name of the feature provided by the source code section, and
generating a relation entry that pairs the source code identifier with the name of the feature.

6. The method of claim 5 wherein forming marked source code for the application to be tested from the relation and the unmarked source code includes:
creating the copy of the unmarked source code, and
based on the relation entry, inserting the pair of text-based markers into the copy to form the marked source code.

7. The method of claim 6 wherein the copy includes the source code section; and
wherein inserting the pair of text-based markers includes:
based on the relation entry, inserting a first text-based marker as a first source code comment ahead of the source code section within the copy and a second text-based marker as a second source code comment after the source code section within the copy to delineate the source code section within the copy.

8. The method of claim 1, further comprising:
running a test procedure that operates the application on processing circuitry to generate section coverage data; and
after running the test procedure, generating application coverage results from the section coverage data, the application coverage results describing test procedure coverage of the source code section.

9. The method of claim 8 wherein running the test procedure includes:
launching the application on a test platform to run the application, and
while the application is running on the test platform, inputting a set of test inputs to the application to exercise the application to generate at least some of the section coverage data.

10. The method of claim 9 wherein generating the application coverage results from the section coverage data includes:
providing a report that identifies a coverage measurement indicating an amount of the source code section that was tested.

11. The method of claim 8 wherein running the test procedure includes:
generating the section coverage data while the processing circuitry performs data storage operations to respond to host input/output (I/O) requests from a set of host computers.

12. The method of claim 11, further comprising:
prior to running the test procedure, loading the application onto a test platform that includes the processing circuitry and a set of storage devices, the host I/O requests being configured to access the set of storage devices.

13. Electronic equipment, comprising:
memory; and
control circuitry coupled with the memory, the memory storing instructions which, when carried out by the control circuitry, cause the control circuitry to perform a method of:
obtaining a source code identifier that identifies a source code section of unmarked source code for an application to be tested,
providing a relation that includes the source code identifier and a feature identifier that identifies a feature provided by the source code section of unmarked source code, and
forming marked source code for the application to be tested from the relation and the unmarked source code, the marked source code for the application to be tested being testable to generate application test coverage results describing test coverage of the source code section, wherein the forming includes inserting a pair of text-based markers into a copy of the unmarked source code to form the marked source code by delineating the marked source between the text-based markers within a copy of the unmarked source code.

14. Electronic equipment as in claim 13 wherein the method further includes:
running a test procedure that operates the application on processing circuitry to generate section coverage data; and
after running the test procedure, generating application coverage results from the section coverage data, the application coverage results describing test procedure coverage of the source code section.

15. Electronic equipment as in claim 14 wherein running the test procedure includes:
generating the section coverage data while the processing circuitry performs data storage operations to respond to host input/output (I/O) requests from a set of host computers.

16. Electronic equipment as in claim 15 wherein obtaining the source code identifier that identifies the source code section includes:
receiving an output from a version control system, the output including multiple source code identifiers identifying lines of unmarked source code for the application to be tested, the source code identifier that identifies the source code section being among the multiple source code identifiers.

17. Electronic equipment as in claim 16 wherein providing the relation includes:
    receiving, as the feature identifier, a name of the feature provided by the source code section, and
    generating a relation entry that pairs the source code identifier with the name of the feature.

18. Electronic equipment as in claim 17 wherein forming marked source code for the application to be tested from the relation and the unmarked source code includes:
    creating the copy of the unmarked source code, the copy including the source code section, and
    based on the relation entry, inserting the pair of text-based markers into the copy to form the marked source code, the pair of text-based markers delineating the source code section included within the copy.

19. A computer program product having a non-transitory computer readable medium which stores a set of instructions to ascertain application test coverage; the set of instructions, when carried out by computerized circuitry, causing the computerized circuitry to perform a method of:

obtaining a source code identifier that identifies a source code section of unmarked source code for an application to be tested;

providing a relation that includes the source code identifier and a feature identifier that identifies a feature provided by the source code section of unmarked source code; and forming marked source code for the application to be tested from the relation and the unmarked source code, the marked source code for the application to be tested being testable to generate application test coverage results describing test coverage of the source code section, wherein the forming includes inserting a pair of text-based markers into a copy of the unmarked source code to form the marked source code by delineating the marked source between the text-based markers within a copy of the unmarked source code.

* * * * *